US010526496B2

(12) United States Patent
Traficante et al.

(10) Patent No.: US 10,526,496 B2
(45) Date of Patent: Jan. 7, 2020

(54) THREE-DIMENSIONAL GRAPHICS MADE ON GRASS USING A CHLOROPHYLL-BASED AGENT

(71) Applicants: Gabriel Traficante, Buenos Aires (AR); Juan Ignacio Gerardo Cecchetto Dasso, Buenos Aires (AR)

(72) Inventors: Gabriel Traficante, Buenos Aires (AR); Juan Ignacio Gerardo Cecchetto Dasso, Buenos Aires (AR)

( * ) Notice: Subject to any disclaimer, the term of this patent is extended or adjusted under 35 U.S.C. 154(b) by 302 days.

(21) Appl. No.: 15/691,199

(22) Filed: Aug. 30, 2017

(65) Prior Publication Data
US 2018/0009256 A1 Jan. 11, 2018

Related U.S. Application Data

(63) Continuation-in-part of application No. PCT/US2016/024930, filed on Mar. 30, 2016.

(51) Int. Cl.
*G09F 19/12* (2006.01)
*G09F 19/22* (2006.01)
(Continued)

(52) U.S. Cl.
CPC ............ *C09D 7/41* (2018.01); *A01D 34/835* (2013.01); *A01G 7/00* (2013.01); *A01G 7/06* (2013.01); *A01G 13/02* (2013.01); *B44C 1/222* (2013.01); *B44F 7/00* (2013.01); *C09D 5/00* (2013.01); *C09D 5/14* (2013.01); *C09D 157/10* (2013.01);
(Continued)

(58) Field of Classification Search
CPC ........ G09F 19/228; B44C 3/00; A01D 34/835
See application file for complete search history.

(56) References Cited

U.S. PATENT DOCUMENTS 4,622,746 A * 11/1986 Appelson ................. A01G 9/28
30/286
6,655,056 B1 * 12/2003 Wolf ........................ G09F 1/10
211/128.1

(Continued)

FOREIGN PATENT DOCUMENTS

KR 20100079422 A * 7/2010
KR 101889258 B1 * 9/2018

OTHER PUBLICATIONS

Athletic field paint steals spotlight from the grass it covers (Aug. 27, 2012) retrieved Aug. 8, 2019 from https://phys.org/news/2012-08-athletic-field-spotlight-grass.html (Year: 2012).*

*Primary Examiner* — Jennifer E Simmons
(74) *Attorney, Agent, or Firm* — Patents on Demand P.A.; Brian K. Buchheit

(57) ABSTRACT

A system for creating three-dimensional grass graphics can include a means for cutting grass with an adjustable cutting height, a chlorophyll-based agent for coloring grass, and at least one stencil. The chlorophyll-based agent can be non-detrimental to a health of the grass and can be available in multiple shades. The stencil can be securable to the grass and can define a graphic to be painted on the grass using the chlorophyll-based agent. The means for cutting the grass can be able to pass over and around the stencil without damaging the stencil. Application of different shades of the chlorophyll-based agent to varying heights of grass can produce a three-dimensional effect for the graphic when viewed.

20 Claims, 4 Drawing Sheets

(51) Int. Cl.

| | |
|---|---|
| *A01D 34/835* | (2006.01) |
| *B44C 1/22* | (2006.01) |
| *B44F 7/00* | (2006.01) |
| *C09D 7/41* | (2018.01) |
| *G09F 19/14* | (2006.01) |
| *A01G 7/06* | (2006.01) |
| *A01G 13/02* | (2006.01) |
| *A01G 7/00* | (2006.01) |
| *C09D 5/00* | (2006.01) |
| *C09D 5/14* | (2006.01) |
| *C09D 157/10* | (2006.01) |
| *G09F 23/00* | (2006.01) |
| *A63C 19/06* | (2006.01) |

(52) U.S. Cl.
CPC .............. *G09F 19/12* (2013.01); *G09F 19/14* (2013.01); *G09F 19/22* (2013.01); *G09F 19/228* (2013.01); *G09F 23/0066* (2013.01); *A63C 19/065* (2013.01)

(56) References Cited

U.S. PATENT DOCUMENTS

| | | | |
|---|---|---|---|
| 8,886,384 B2 * | 11/2014 | Chung | A01D 34/008 56/229 |
| 8,935,091 B2 * | 1/2015 | Davis | B44C 3/00 347/110 |
| 2004/0233242 A1 * | 11/2004 | Patton | B41J 3/28 347/14 |
| 2008/0057184 A1 * | 3/2008 | Stein | B05B 12/20 427/136 |
| 2010/0030709 A1 * | 2/2010 | Carr | A01M 29/32 705/500 |

* cited by examiner

100

User creates three-dimensional graphic on an area of grass using a three-dimensional grass graphic creation system and a means for cutting grass
105

Viewer views three-dimensional graphic on the grass when within the viewing range of the chlorophyll-based agent
110

Viewer overlooks three-dimensional graphic on the grass when outside the viewing range of the chlorophyll-based agent
115

FIG. 1

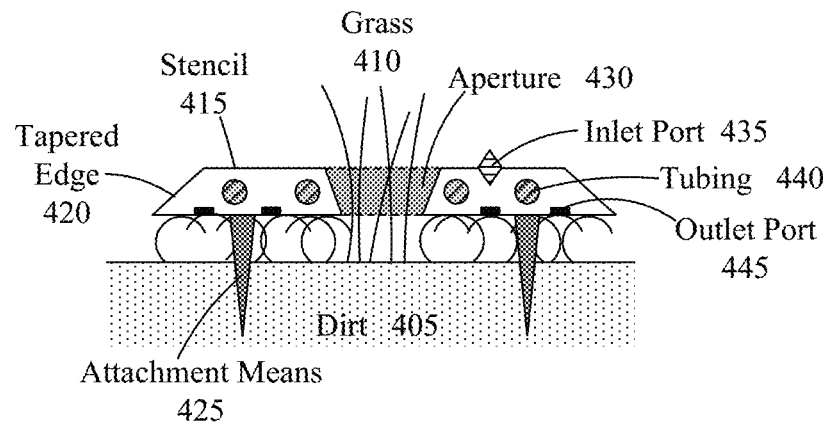
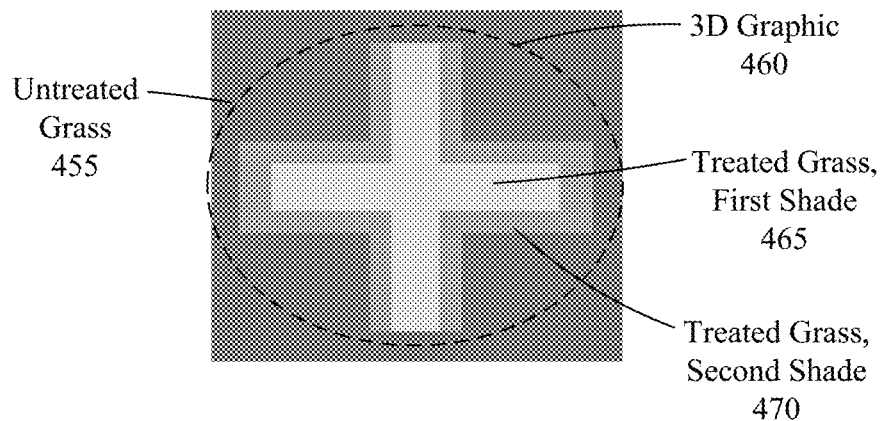
FIG. 4

THREE-DIMENSIONAL GRAPHICS MADE ON GRASS USING A CHLOROPHYLL-BASED AGENT

CROSS-REFERENCE TO RELATED APPLICATIONS

This is a continuation in part application of PCT/US16/24930 titled "A CHLOROPHYLL-BASED AGENT FOR MARKING LIVING GREENERY" (Filed 2016 Mar. 30), which is incorporated by reference herein in its entirety.

BACKGROUND

The present invention relates to the field of decorative treatments for grass and, more particularly, to three-dimensional graphics made on grass using a chlorophyll-based agent.

Graphics, whether team names or sponsor logos, are commonplace on grassy sports fields. Revenues from selling this type of advertising space is a budget staple for many teams or venues. Typically, only areas of the field that are not used during play are available for advertising, in order to not distract players. However, this specialized chlorophyll-based agent is not viewable by players in close proximity, which greatly increases the area of the field where graphics can be applied.

As with conventional applications of graphics on grass using paint, application of a graphic using the chlorophyll-based agent is two-dimensional. What is needed is a means of applying the chlorophyll-based agent to create a graphic that is more noticeable and eye-catching to viewers.

BRIEF SUMMARY

One aspect of the present invention can include a system for creating three-dimensional grass graphics. Such a system can include a means for cutting grass with an adjustable cutting height, a chlorophyll-based agent for coloring grass, and at least one stencil. The chlorophyll-based agent can be non-detrimental to a health of the grass and can be available in multiple shades. The stencil can be securable to the grass and can define a graphic to be painted on the grass using the chlorophyll-based agent. The means for cutting the grass can be able to pass over and around the stencil without damaging the stencil. Application of different shades of the chlorophyll-based agent to varying heights of grass can produce a three-dimensional effect for the graphic when viewed.

Another aspect of the present invention can include a method that begins with securing a stencil to an area of grass at a desired height. The stencil can define a graphic. The grass that is unobstructed by the stencil can be cut to the desired height. The grass underneath the stencil can remain at an original height that is greater than the desired height. The chlorophyll-based agent in a first shade can be applied to the cut grass. The chlorophyll-based agent in a second shade can then be applied to the grass underneath the stencil. The difference in coloring between the grass at the original height and the grass cut at the desired height can produce a three-dimensional effect for the graphic when viewed. Lastly, the stencil can be removed from the grass.

Yet another aspect of the present invention can include an advertisement system that includes a field, a means for cutting grass, a chlorophyll-based agent, and a stencil. The field can be comprised of grass and can have a sport played thereupon. The means for cutting grass can be used on the field and can have an adjustable cutting height. The chlorophyll-based agent can be used for coloring the grass. The chlorophyll-based agent can be non-detrimental to the health of the grass and can be available in multiple shades. The stencil can be securable to the grass and can define a graphic to be painted on an area of the field using the chlorophyll-based agent. The means for cutting the grass can be able to pass over and around the stencil without damaging the stencil. Application of the chlorophyll-based agent to grass of a different height than neighboring grass can produce a three-dimensional effect for the graphic when viewed.

BRIEF DESCRIPTION OF THE SEVERAL VIEWS OF THE DRAWINGS

FIG. 1 is a flowchart of a method describing the general use of a three-dimensional grass graphic creation system to make a three-dimensional graphic in accordance with embodiments of the inventive arrangements disclosed herein.

FIG. 4 is a set of illustrations that graphically depict the use of the three-dimensional grass graphic creation system to create a three-dimensional graphic in accordance with embodiments of the inventive arrangements disclosed herein.

DETAILED DESCRIPTION

The present invention discloses a solution for creating a three-dimensional graphic on grass using varying grass heights and different shades of a chlorophyll-based agent. Stencils defining the graphic can be secured to a desired grassy location. The grass can then be cut to the desired height with the grass covered by the stencil remaining uncut. Different shades of the chlorophyll-based agent can be applied to the different grass heights to produce a three-dimensional effect for the graphic when viewed.

As will be appreciated by one skilled in the art, aspects of the present invention may be embodied as a system or method. Aspects of the present invention are described below with reference to flowchart illustrations and/or block diagrams of methods and apparatus (systems) according to embodiments of the invention.

FIG. 1 is a flowchart of a method 100 describing the general use of a three-dimensional grass graphic creation system to make a three-dimensional graphic in accordance with embodiments of the inventive arrangements disclosed herein. Method 100 can begin in step 105 where a user can create a three-dimensional (3D) graphic on an area of grass using a three-dimensional grass graphic creation system and a means for cutting grass. The three-dimensional grass graphic creation system can utilize the chlorophyll-based agent as described in PCT/US16/24930.

It can be assumed that the user, in step 105, has been authorized to create the graphic on the area of grass. For example, the user can be a groundskeeper for a sports field who is charged with putting team names on areas of the playing field.

Viewers can then view the three-dimensional graphic on the grass when they are within the viewing range of the chlorophyll-based agent in step 110. The chlorophyll-based agent can have a distance range at which markings made with the chlorophyll-based agent are viewable. Viewers who are outside of the viewing range, as in step 115, can overlook the three-dimensional graphic that was made on the grass with the chlorophyll-based agent.

Figure 2:
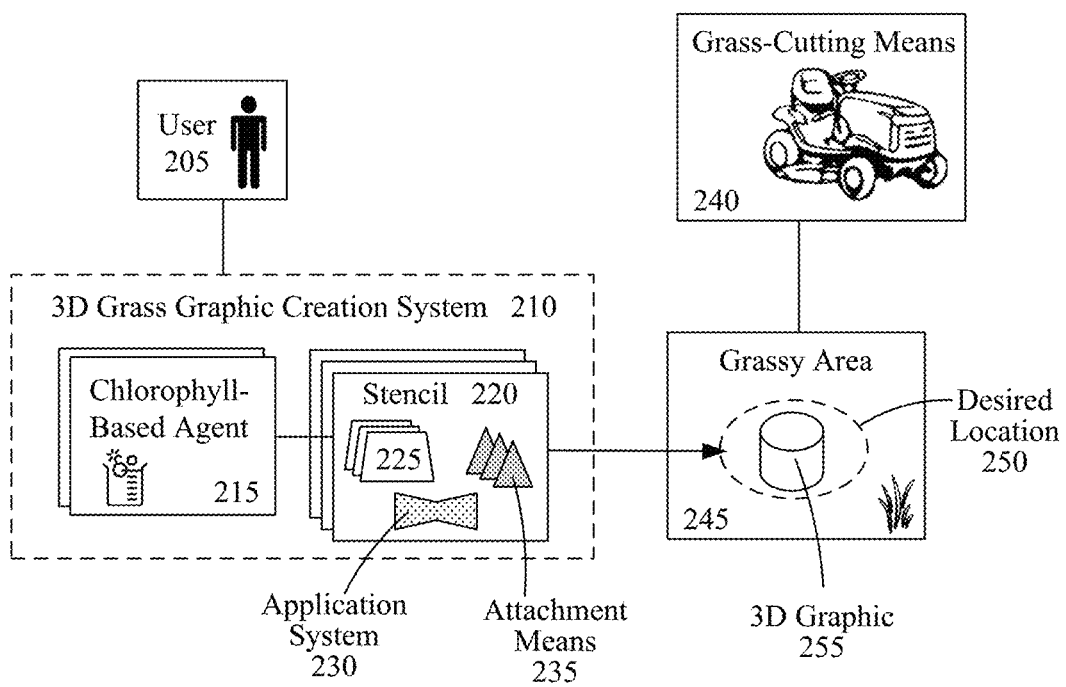
FIG. 2 is a block diagram of a system for using a three-dimensional grass graphic creation system in accordance with embodiments of the inventive arrangements disclosed herein.

FIG. 2 is a block diagram of a system 200 for using a three-dimensional grass graphic creation system 210 in accordance with embodiments of the inventive arrangements disclosed herein. System 200 can support execution of the steps of method 100.

In system 200, a user 205 can use the three-dimensional grass graphic creation system 210 in conjunction with a grass-cutting means 240 to produce a three-dimensional graphic 255 in a desired location 250 of a grassy area 245. The grassy area 245 can represent a variety of locations of a size to support use of the three-dimensional grass graphic creation system 210 like a sports field or large lawn. The desired location 250 can be a section of the grassy area 245 designated for the three-dimensional graphic 255.

In other embodiments, the grassy area 245 can also include other types of ground-covering green vegetation like moss or ivy.

The three-dimensional grass graphic creation system 210 can represent the means by which the user 205 can paint the three-dimensional graphic 255 on the desired location 250. These means can include chlorophyll-based agents 215 and stencils 220 used in conjunction with a grass-cutting means 240.

The chlorophyll-based agent 215 can be product that utilizes natural chlorophyll to color the grassy area 245 like that taught in PCT/US16/24930. The chlorophyll-based agent 215 can be permanent, yet non-detrimental to the health of the grass in the desired location 250 to which it is applied. Unlike conventional paints and dyes used on grassy areas 245, the chlorophyll-based agent 215 can allow the grass treated in the desired location 250 to continue to grow normally; a conventional grass paint can inhibit photosynthesis and cause treated grass to die. Further, the visibility of the three-dimensional graphic 255 can be limited to viewing range of the chlorophyll-based agent 215, which is approximately between one meter and 549 meters with a viewing angle of at least 20 degrees.

Because chlorophyll is utilized as the main coloring substance, the chlorophyll-based agent 215 can be limited to varying shades and intensities of the green spectrum. Basic artistic principles of painting graphics in a two-dimensional medium that look three-dimensional can recommend that multiple shades and/or intensities of the chlorophyll-based agent 215 be used to create the three-dimensional graphic 255. For example, outlining text made with a light and/or bright shade of the chlorophyll-based agent 215 with a chlorophyll-based agent 215 in a darker/deeper shade can make the text to "pop" off the surface of the desired location 250.

Building upon this concept of making a three-dimensional graphic 255 in a two-dimensional medium, the grass-cutting means 240 can be used to cut the grass in the desired location 250 to different heights. Coloring the grass at different heights with different shades/intensities of the chlorophyll-based agent 215 can further reinforce the three-dimensional visualization of the graphic 255.

The grass-cutting means 240 can represent a variety of machines and/or tools capable of trimming grass or other vegetation. Examples of the grass-cutting means 240 can include, but are not limited to, a push mower, a riding lawn mower, a string trimmer (e.g., weed trimmer), a tractor with a mower attachment, a programmable automated mowing device (e.g., robotic lawn mower), a scythe, a sickle, a grass whip, and shears. The quantity and/or type of grass-cutting means 240 used can vary based on what is available to the user 205 as well as the complexity of the three-dimensional graphic 255 that is being created.

For example, large areas can be easily cut with a riding lawn mower, whereas small details are better trimmed with hand shears.

Further, the grass-cutting means 240 can be used to remove the chlorophyll-based agent 215 from unwanted portions of the grass. For example, the chlorophyll-based agent 215 may have spilled onto an adjacent section of the grassy area 245. The grass-cutting means 240 can be used to "clean" that area as well as straighten the outer borders of the three-dimensional graphic 255.

The stencils 220 can be components that provide physical and visual guidance when applying the chlorophyll-based agent 215 and/or using the grass-cutting means 240. Like those commonly available, the stencils 220 can be planar sheets that have apertures for applying the chlorophyll-based agent 215 through or shaped planar pieces meant to have the chlorophyll-based agent 215 applied around, protecting the grass beneath the stencil 220 from application. A combination of different types of stencils 220 can be used to create the three-dimensional graphic 255.

The stencils 220 can be made from a durable material that can withstand the weight of the user 205 and/or the grass-cutting means 240 passing over it while on the desired location 250. For example, a large stencil 220 can be wider than the lawn mower 240, requiring the user 205 to walk over the stencil 220 with the lawn mower 240 in order to cut the grass.

The stencils 220 can also include tapered edges 225, an application system 230, and attachment means 235. The tapered edges 225 can decrease the likelihood that the user 205 and/or grass-cutting means 240 disturbs the position of the stencil 220. The tapered edges 225 can act like a ramp for grass-cutting means 240 having wheels like lawn mowers and for the user's 205 feet.

The attachment means 235 can represent elements that secure the stencils 220 to the desired location 250. The attachment means 235 can be made of a durable material suitable for placement in the ground. Depending upon the specific implementation, the attachment means 235 can pass through the thickness of the stencil 220 or be attached to the exterior of the stencil 220. Examples of attachment means 235 can include, but are not limited to, stakes, spikes, ground anchors, pegs, and the like.

The application system 230 can be a means by which the chlorophyll-based agent 215 can be applied to the grass underneath the stencil 220 while the stencil 220 is secured to the desired location 250. A variety of application systems 230 can be used and consideration should be given to the expected usage. For example, the application system 230 can be a sponge-like layer on the bottom surface of the stencil 220 to hold chlorophyll-based agent 215 until released when the stencil 220 is placed on the grass like a rubber stamp.

As a more complex example, the application system 230 can be an interconnected arrangement of tubing contained within the thickness of the stencil 220. The tubing can connect an input port, where the chlorophyll-based agent 215 is poured into, to output ports or holes in the bottom surface of the stencil 220 to distribute the chlorophyll-based agent 215 while the stencil 220 is still secured to the desired location 250. Such a complex application system 230 can allow for the multiple shades of the chlorophyll-based agent 215 to be applied a short time apart on the different heights of grass; a dark shade can be applied to the grass around the stencil 220 and the lighter shade to the grass underneath the stencil 220.

Other embodiments of the present invention can utilize multiple types of application systems 230 on the same stencil 220 to apply multiple chlorophyll-based agents 215 simultaneously. For example, a sponge-like application system 230 can be used to stamp on one color while a tubing application system 230 applies a different color.

Figure 3:
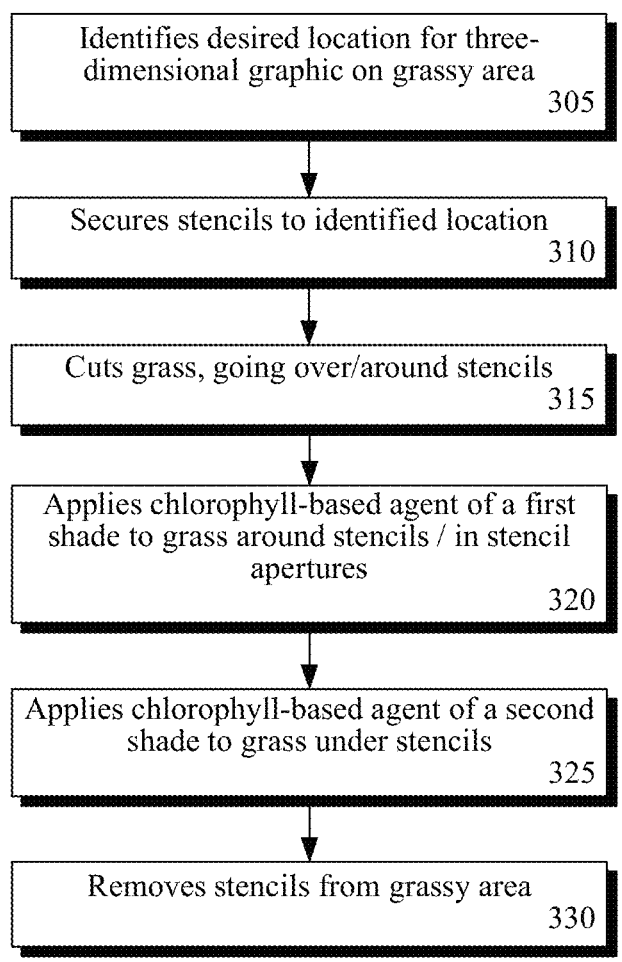
FIG. 3 is a flowchart of a method detailing the use of the three-dimensional grass graphic creation system in accordance with embodiments of the inventive arrangements disclosed herein.

FIG. 3 is a flowchart of a method 300 detailing the use of the three-dimensional grass graphic creation system in accordance with embodiments of the inventive arrangements disclosed herein. Method 200 can be performed within the context of system 200 and can represent a specific implementation of step 105 of method 100.

Method 300 can begin in step 305 where the desired location for the three-dimensional graphic can be identified on the grassy area. Step 305 can require a variety of additional equipment like pictures, people, markers, and the like. The stencils can then be secured to the identified location in step 310.

In step 315, the grass in the identified location can be cut, which can require going over and/or around the secured stencils. The chlorophyll-based agent of a first shade can be applied to the grass that is around the stencils and/or accessible through the apertures of the stencils in step 320.

In step 325, the chlorophyll-based agent in a second shade can be applied to the grass underneath the stencils. The stencils can then be removed from the grassy area in step 330. Step 330 may be performed after a predetermined time to allow the chlorophyll-based agents to adequately dry so as to not ruin the look of the three-dimensional graphic.

It can be recommended that steps 310-325 be planned ahead of time in order to determine the various heights of the grass and/or the shades of the chlorophyll-based agent to use for the three-dimensional graphic.

FIG. 4 is a set of illustrations 400 and 450 that graphically depict the use of the three-dimensional grass graphic creation system to create a three-dimensional graphic 460 in accordance with embodiments of the inventive arrangements disclosed herein. Illustration 400 can be a cross-sectional view showing the placement of a stencil 415 on a grassy area.

The stencil 415 can be secured at the desired location by inserting the attachment means 425 (e.g., spikes) into the dirt 405 such that the stencil 415 is at a desired height. As shown in illustration 400, some of the grass 410 can be covered by the stencil 415 while other grass 410 may extend upwards through an aperture 430 in the stencil 415. The grass 410 that is accessible via the aperture 430 can be cut by the grass-cutting means (not shown) prior to application of the first shade of chlorophyll-based agent. The tapered edges 420 of the stencil 415 can direct the grass-cutting means over the top of the stencil 415 to avoid disturbances to the placement of the stencil 415.

In this example, the stencil 415 can have an embedded application system for applying the second shade of the chlorophyll-based agent to the grass 410 beneath the stencil 415. As previously mentioned, an inlet port 435 can receive the chlorophyll-based agent from a container or other system like a sprayer. The chlorophyll-based agent can then traverse a network of tubing 440 that connects the input port 435 to multiple outlet ports 445 on the bottom of the stencil 415.

An example three-dimensional graphic 460 can be shown in illustration 450. The grass 455 that is not treated with any chlorophyll-based agent can be represented by the darker grey color. The three-dimensional graphic 460 can be a plus sign. The grass 465 treated with the first (lighter) shade of chlorophyll-based agent can be the inner plus sign. The grass 465 treated with the first shade can be outlined by grass 470 treated with the second (darker) shade of the chlorophyll-based agent.

Putting the example three-dimensional graphic 460 into the context of illustration 400, a stencil 415 of the plus sign can be secured to the grass 410 and the grass 410 cut. The user can apply the first shade of the chlorophyll-based agent to the grass 465 via the inlet port 435, tubing 440, and outlet ports 445 of the stencil 415. Then, the user can apply the second shade of the chlorophyll-based agent around the tapered edges 420 of the stencil 415 using a brush or sprayer.

The diagrams in the Figures illustrate the architecture, functionality, and operation of possible implementations of systems and methods according to various embodiments of the present invention. It will also be noted that each block of the block diagrams and combinations of blocks in the block diagrams can be implemented by special purpose hardware-based systems that perform the specified functions or acts, or combinations of special purpose hardware and computer instructions.

What is claimed is:

1. A system for creating three-dimensional grass graphics comprising:
    a means for cutting grass having an adjustable cutting height;
    a chlorophyll-based agent for coloring grass, wherein said chlorophyll-based agent is non-detrimental to a health of the grass, wherein said chlorophyll-based agent is available in a plurality of shades; and
    at least one stencil able to be secured to the grass that defines at least a portion of a graphic to be painted on the grass using the chlorophyll-based agent, wherein the means for cutting the grass is able to pass over and around the at least one stencil without damaging the at least one stencil, wherein application of the plurality of shades of the chlorophyll-based agent to varying heights of grass produces a three-dimensional effect for the graphic when viewed.

2. The system of claim 1, wherein the means for cutting the grass comprises at least one of a push mower, a riding lawn mower, a string trimmer, a tractor with a mower attachment, a programmable automated mowing device, a scythe, a sickle, a grass whip, and shears.

3. The system of claim 1, wherein the graphic comprises at least one of text, an image, a line, and a geometric shape.

4. The system of claim 1, wherein the at least one stencil further comprises:
    an application means for applying the chlorophyll-based agent to the grass underneath a stencil, wherein said application means is integrated into the at least one stencil.

5. The system of claim 4, wherein the application means further comprises:
    a specialized layer on a bottom surface of the at least one stencil, wherein the chlorophyll-based agent is applied to the specialized layer prior to placement of the at least one stencil on the grass, wherein said specialized layer has a texture that holds the applied chlorophyll-based agent until transferred to the grass, wherein the chlorophyll-based agent is of a viscosity commensurate with such an application means.

6. The system of claim 4, wherein the application means further comprises:

at least one inlet port for receiving the chlorophyll-based agent that is accessible when the at least one stencil is secured to the grass;

a plurality of outlet ports for dispensing the chlorophyll-based agent; and a plurality of tubing connecting the at least one inlet port to the plurality of outlet ports, wherein said plurality of tubing is contained within a thickness of the stencil.

7. The system of claim 1, wherein the grass is a part of one of a sports venue, an entertainment venue, an agricultural area, a nature park, and a pasture.

8. The system of claim 1, wherein the at least one stencil is secured using at least one of a stake, a spike, a peg, and a ground anchor.

9. The system of claim 1, wherein edges of the at least one stencil are tapered to mitigate disturbing a position of the at least one stencil when the means for cutting the grass is in use.

10. A method comprising:
securing a stencil to an area of grass at a desired height, wherein the stencil defines a graphic;
cutting grass unobstructed by the stencil to the desired height, wherein grass underneath the stencil remains at an original height that is greater than the desired height;
applying a chlorophyll-based agent in a first shade to the cut grass;
applying a chlorophyll-based agent in a second shade to the grass underneath the stencil, wherein a difference in coloring between the grass at the original height and the grass cut at the desired height produces a three-dimensional effect for the graphic when viewed; and
removing the stencil from the grass.

11. The method of claim 10, wherein the steps of said method are repeated using a plurality of stencils and a plurality of shades of the chlorophyll-based agent.

12. The method of claim 10, wherein the graphic comprises at least one of text, an image, a line, and a geometric shape.

13. The method of claim 10, wherein applying the chlorophyll-based agent in the second shade further comprises:
connecting a container having the chlorophyll-based agent in the second shade stored therein to an input port of an application means that is incorporated into the stencil;
driving the chlorophyll-based agent in the second shade from the container to the grass underneath the stencil via the application means, wherein the chlorophyll-based agent in the second shade exits the application means on an underside of the stencil; and
upon completion of the application of the chlorophyll-based agent, disconnecting the container from the input port.

14. The method of claim 13, wherein the driving of the chlorophyll-based agent in the second shade utilizes one of water pressure and air pressure.

15. The method of claim 10, wherein the applying of the chlorophyll-based agent in the first shade utilizes one of a brush, a roller, a sprayer, an aerosol can, and a machine that utilizes at least one such means.

16. The method of claim 10, wherein, when the stencil is used as a stamp, a bottom surface of the stencil is saturated with the chlorophyll-based agent in the second shade prior to the securing of the stencil to the grass, wherein the applying of the chlorophyll-based agent in the second shade further comprises:
depressing the stencil on the grass at a predefined pressure for a predetermined time.

17. An advertisement system comprising:
a field comprised of grass upon which a sport is played;
a means for cutting the grass of the field having an adjustable cutting height;
a chlorophyll-based agent for coloring the grass, wherein said chlorophyll-based agent is non-detrimental to a health of the grass, wherein said chlorophyll-based agent is available in a plurality of shades; and
at least one stencil able to be secured to the grass that defines at least a portion of a graphic to be painted on an area of the field using the chlorophyll-based agent, wherein the means for cutting the grass is able to pass over and around the at least one stencil without damaging the at least one stencil, wherein application of the chlorophyll-based agent to grass of a different height than neighboring grass produces a three-dimensional effect for the graphic when viewed.

18. The advertisement system of claim 17, wherein the graphic comprises at least one of text, an image, a line, and a geometric shape.

19. The advertisement system of claim 17, wherein edges of the at least one stencil are tapered to mitigate disturbing a position of the at least one stencil when the means for cutting the grass is in use.

20. The advertisement system of claim 17, wherein the at least one stencil further comprises:
an application means for applying the chlorophyll-based agent to the grass underneath a stencil, wherein said application means is integrated into the at least one stencil.

* * * * *